(12) United States Patent
Nishimura et al.

(10) Patent No.: US 7,637,734 B2
(45) Date of Patent: Dec. 29, 2009

(54) STATIONARY PLATEN OF INJECTION MOLDING MACHINE

(75) Inventors: Koichi Nishimura, Yamanashi (JP); Masatoshi Senga, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 12/131,312

(22) Filed: Jun. 2, 2008

(65) Prior Publication Data
US 2009/0011073 A1  Jan. 8, 2009

(30) Foreign Application Priority Data
Jul. 4, 2007  (JP) .............................. 2007-175976

(51) Int. Cl.
  *B29C 45/17* (2006.01)
(52) U.S. Cl. ...................... 425/472; 425/595
(58) Field of Classification Search ................ 425/595, 425/451.9, 472
See application file for complete search history.

(56) References Cited

U.S. PATENT DOCUMENTS

| | | | | |
|---|---|---|---|---|
| 3,418,692 | A * | 12/1968 | Valyi | 425/451.2 |
| 6,027,329 | A * | 2/2000 | Nazarian et al. | 425/451.9 |
| 6,328,553 | B1 * | 12/2001 | Joyner et al. | 425/595 |
| 6,379,145 | B1 * | 4/2002 | Urbanek | 425/595 |
| 6,655,949 | B2 * | 12/2003 | Chikazawa et al. | 425/595 |
| 6,746,232 | B2 * | 6/2004 | Becker et al. | 425/589 |
| 6,805,827 | B2 * | 10/2004 | Kami et al. | 425/595 |

FOREIGN PATENT DOCUMENTS

| | | |
|---|---|---|
| JP | 61233519 A | 10/1986 |
| JP | 02-214637 A | 8/1990 |
| JP | 7-35020 U | 6/1995 |
| JP | 2004-136506 A | 5/2004 |

OTHER PUBLICATIONS

Notice of Reasons for Rejection for JP2007-175976 mailed Dec. 2, 2008.

* cited by examiner

*Primary Examiner*—James Mackey
(74) *Attorney, Agent, or Firm*—Lowe Hauptman Ham & Berner LLP

(57) ABSTRACT

A stationary platen of an injection molding machine is composed of a mold mounting plate, a tie-bar connecting member, and a mold clamping force transmission plate. The mold mounting plate is formed of a planar portion for mold fixing and a cylindrical connecting portion that extends from the planar portion and passes through a central through hole of the tie-bar connecting member. The mold clamping force transmission plate connects the cylindrical connecting portion of the mold mounting plate and the tie-bar connecting member with a predetermined gap therebetween lest the connecting member and the mounting plate come into contact and interfere with each other.

5 Claims, 8 Drawing Sheets

BOLT HOLE

STATIONARY PLATEN OF INJECTION MOLDING MACHINE

RELATED APPLICATIONS

The present application is based on, and claims priority from, Japanese Application Number 2007-175976, filed Jul. 4, 2007, the disclosure of which is hereby incorporated by reference herein in its entirety.

BACKGROUND OF THE INVENTION

1. Field of the Invention

The present invention relates to an improvement of a mold clamping mechanism of an injection molding machine, and more particularly, to the construction of a stationary platen.

2. Description of the Related Art

As shown in FIG. 6, a mold clamping device of an injection molding machine is composed of a stationary platen 1' set on a platform (not shown), a plurality of tie bars 2 fixed individually to the corners of the stationary platen, a movable platen 3 set for movement along the tie bars 2, and a mechanism for operating the movable platen 3. A stationary mold 4 and a movable mold 5 are set on the centers of the stationary platen 1' and the movable platen 3, respectively. The stationary and movable molds 4 and 5 are opened and closed by a mold clamping device.

The stationary platen 1' has its corners supported by the tie bars 2 and is configured to receive a reaction force in the center from the stationary mold 4. When a mold clamping force is applied to the stationary platen 1', its mold mounting surface 6' is deformed like a bowl, as indicated by two-dot chain line in FIG. 6, whereupon the contact surface pressure at the central parts of the molds drops inevitably. In some cases, therefore, burrs may be formed near the centers of the molds.

According to a technique described in Japanese Patent Application Laid-Open No. 2-214637, in order to solve this problem, a mold clamping force transmission portion 8 with a small outside diameter is disposed on the mold mounting surface of the stationary platen 1', as shown in FIG. 7. A mold mounting plate 7 is attached to the stationary platen 1' by means of the mold clamping force transmission portion 8, and a stationary mold is mounted on the mold mounting plate 7. In consequence, even if the stationary platen 1' is deformed like a bowl by a mold clamping force, the deformation cannot be transmitted to the mold mounting plate 7 with ease.

According to a technique described in Japanese Utility Model Application Laid-Open No. 7-35020, moreover, a stationary platen of an injection molding machine is grooved so that its deformation cannot be transmitted to molds.

In a mold clamping device shown in FIG. 7, however, in fact, the pressure is concentrated on a region of the mold mounting plate 7 near the outer peripheral edge of the mold clamping force transmission portion 8 and drops gradually toward the center of the mold mounting plate 7, as shown in FIG. 8. Under the influence of this pressure concentration, the pressure at the central part of the parting surfaces 9 of molds tends to drop. In some cases, therefore, burrs may be formed near the centers of the molds, so that the mold mounting plate 7 must be thickened.

According to a technique described in Japanese Patent Application Laid-Open No. 2004-136506, furthermore, a mounting plate and a piston are fitted into a central opening (cylinder portion) of a stationary platen by insertion. Since a mold clamping force is transmitted from a compression chamber, however, then it propagates from the peripheral part of the mounting plate, so that the mold clamping force is reduced near a central bore of the piston. If the piston receives a reaction force when a nozzle is pressed against a mold with a shift cylinder for driving an injection unit connected with the aid of an adapter, the mold clamping force near the central bore is further reduced inevitably.

SUMMARY OF THE INVENTION

Accordingly, the object of the present invention is to provide a stationary platen used in an injection molding machine and capable of preventing reduction of a mold clamping force without increasing the thickness of a mold mounting plate.

In order to achieve the above object, a stationary platen of an injection molding machine according to the present invention comprises a mold mounting plate integrally formed of a planar portion for mold fixing and a cylindrical connecting portion extending from the planar portion, a tie-bar connecting member having a first through hole for tie bar insertion and a second through hole penetrated by the cylindrical connecting portion, and a mold clamping force transmission plate which connects respective injection-mechanism-side end faces of the cylindrical connecting portion and the tie-bar connecting member.

The cylindrical connecting portion of the mold mounting plate may be formed so that the outside diameter of a junction with the planar portion for mold fixing is smaller than that of a junction with the mold clamping force transmission plate.

At least a part of an annular region of the mold clamping force transmission plate defined between a mounting portion for the tie-bar connecting member and a mounting portion for the cylindrical connecting portion may be reduced in thickness.

In the stationary platen according to the invention, the connecting portion of the mold mounting plate is lengthened, so that concentrated stresses are dispersed and equalized before they reach a mold mounting portion of the mold mounting plate, and therefore, the surface pressure at the central portion of the mold mounting plate can be prevented from dropping. Since the connecting portion is deformable, moreover, a deformation cannot be easily transmitted to a mold surface.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
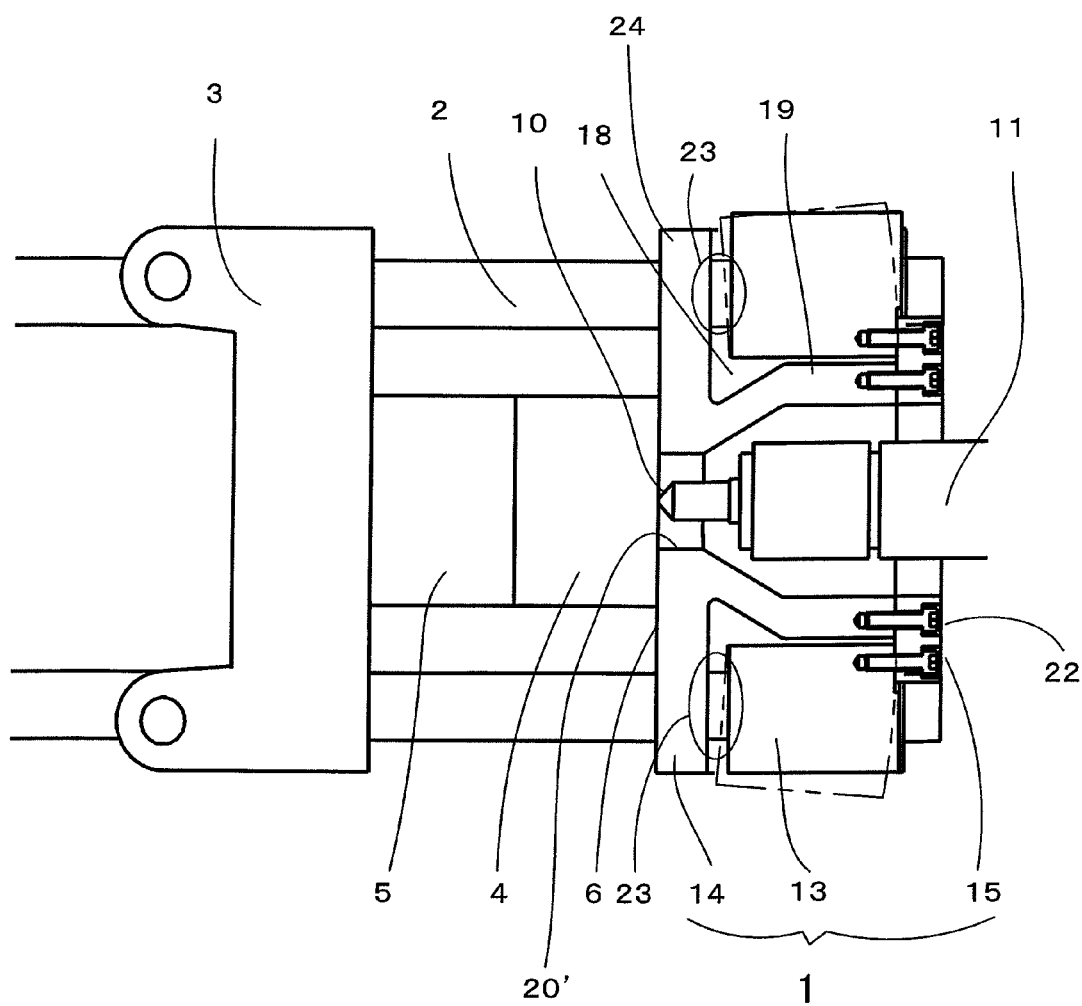
FIG. 1 is a view showing a mold clamping device of an injection molding machine using a stationary platen according to a first embodiment of the invention.

A mold clamping device of an injection molding machine using a stationary platen according to a first embodiment of the present invention will first be described with reference to FIGS. 1 and 2.

The mold clamping device of the injection molding machine is composed of a stationary platen 1 set on a platform (not shown), a plurality of tie bars 2 fixed individually to the corners of the stationary platen, a movable platen 3 set for movement along the tie bars 2, and a mechanism (not shown) for operating the movable platen 3. A stationary mold 4 and a movable mold 5 are set on the centers of the stationary platen 1 and the movable platen 3, respectively. The stationary and movable molds 4 and 5 are opened and closed by a mold clamping device.

The stationary platen 1 is composed of a tie-bar connecting member 13, a mold mounting plate 14, and a mold clamping force transmission plate 15. The connecting member 13 is formed with through holes 21 at its four corners into which the tie bars 2 are inserted. Further, a through hole 18 for the passage of a cylindrical connecting portion 19 (mentioned later) is formed in the center of the connecting member 13, whereby a mold clamping force is transmitted to the tie bars.

The mold mounting plate 14 is an integral structure formed of a planar portion 24 for mold fixing and the cylindrical connecting portion 19 that transmits the mold clamping force toward an injection mechanism. The planar portion 24 is located parallel to that end face of the tie-bar connecting member 13 on the side of the movable platen 3, while the cylindrical connecting portion 19 is inserted into the through hole 18 in the center of the connecting member 13. Further, a through hole 20' is disposed in the center of the planar portion 24 such that the distal end of a nozzle 10 can project from a mold mounting surface 6 of the planar portion 24 through it.

The mold clamping force transmission plate 15 is a member that connects the tie-bar connecting member 13 and the mold mounting plate 14 with a predetermined gap 23 (e.g., about 5 mm long) therebetween lest the connected members contact and interfere with each other. As shown in FIG. 1, the transmission plate 15 is connected by bolts 22 to respective injection-mechanism-side end faces of the tie-bar connecting member 13 and the cylindrical connecting portion 19 of the mold mounting plate 14.

An elastic member such as a spring that cannot easily transmit a deformation of the tie-bar connecting member 13 to the mold mounting plate 14 may be disposed in the gap 23 between the movable-platen-side end face of the tie-bar connecting member 13 and the injection-mechanism-side end face of the planar portion 24 of the mold mounting plate 14. By doing this, the connecting member 13 and the mounting plate 14 can be prevented from contacting and interfering with each other.

Further, that end portion of the cylindrical connecting portion 19 of the mold mounting plate 14 opposite from the injection-mechanism-side end face (or the end portion of the cylindrical connecting portion 19 that is connected to the mold clamping force transmission plate 15) is connected to the planar portion 24 for mold fixing. The connecting portion 19 is formed in such a manner that its outside and inside diameters decrease from the injection-mechanism-side end face toward the planar portion 24 for mold fixing. Thus, the mold clamping force can be transmitted to the center of the mold mounting plate 14 (or planar portion 24).

Figure 2:
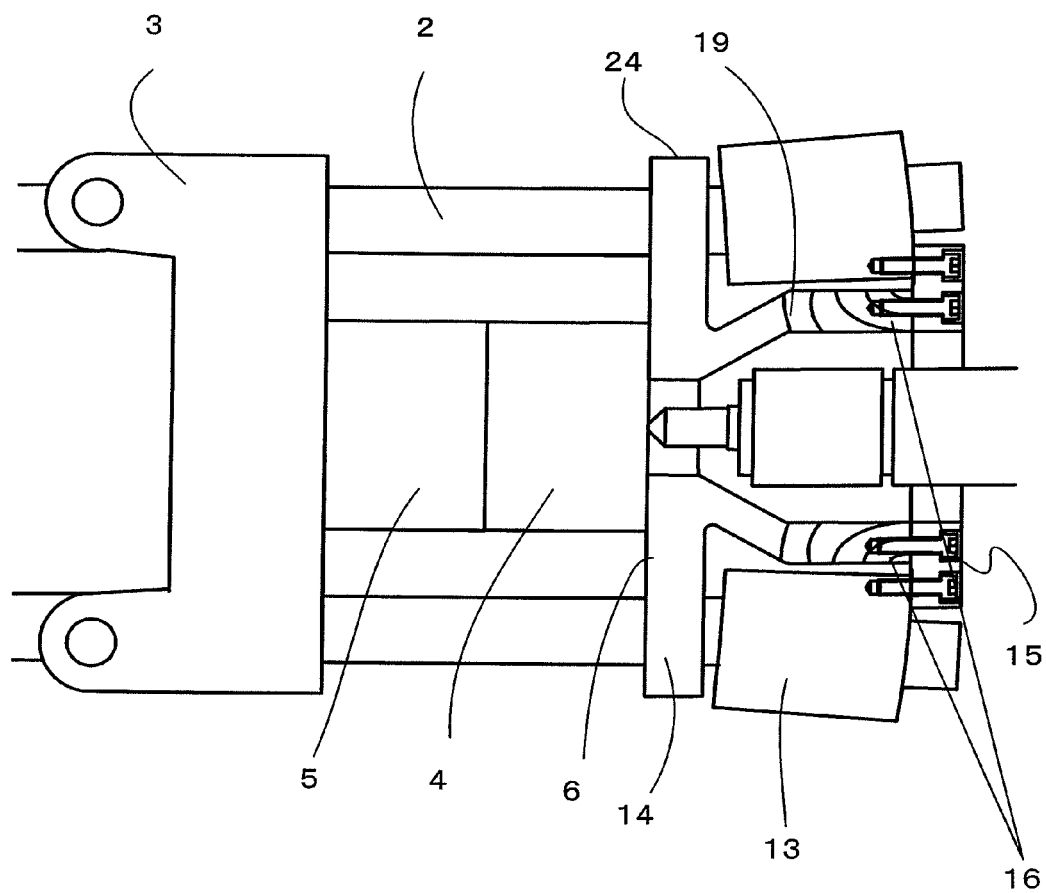
FIG. 2 is a view showing a stress distribution observed when a mold clamping force acts on the mold clamping device of FIG. 1.

FIG. 2 is a view showing a stress distribution on the mold mounting plate 14 (or cylindrical connecting portion 19) observed when the mold clamping force acts on the mold clamping device.

The cylindrical connecting portion 19 of the mold mounting plate 14 extends long from a junction with the planar portion 24 toward the injection mechanism (not shown) along the axis of a barrel 11 through the through hole 18 in the center of the tie-bar connecting member 13. In consequence, stresses concentrated on junctions (see stress concentration regions 16 shown in FIG. 2) between the connecting portion 19 and the mold clamping force transmission plate 15 are dispersed and equalized before they reach the mold mounting surface 6 of the planar portion 24. Thus, the surface pressure of the mold mounting plate 14 (or planar portion 24) can be prevented from dropping.

Figure 3A:
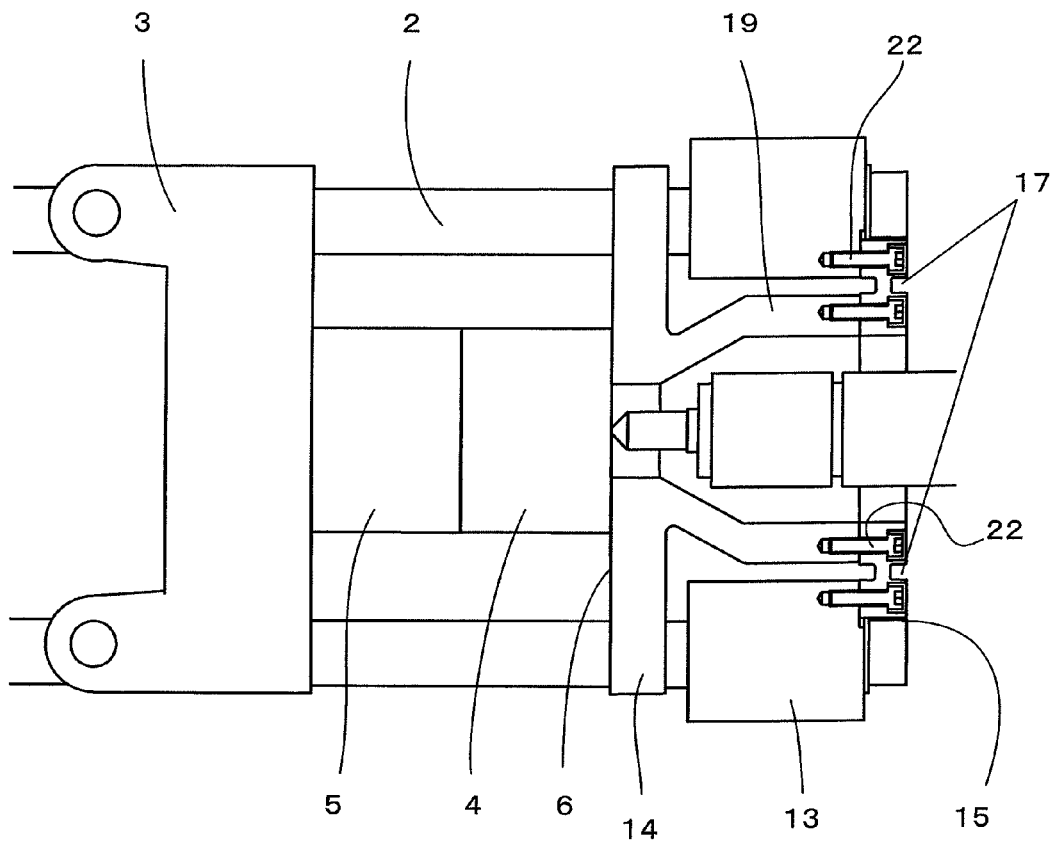
FIG. 3A is a view showing a mold clamping device of an injection molding machine using a stationary platen according to a second embodiment of the invention.
Figure 3B:
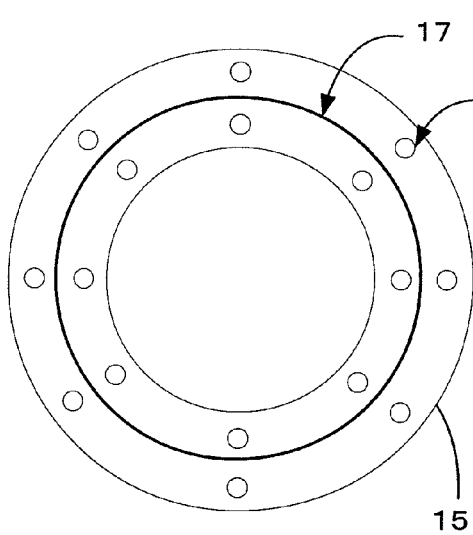
FIG. 3B is a view showing a first example of a region (entire circumference of an annular region) at which a mold clamping force transmission plate shown in FIG. 3A is thinned.
Figure 3C:
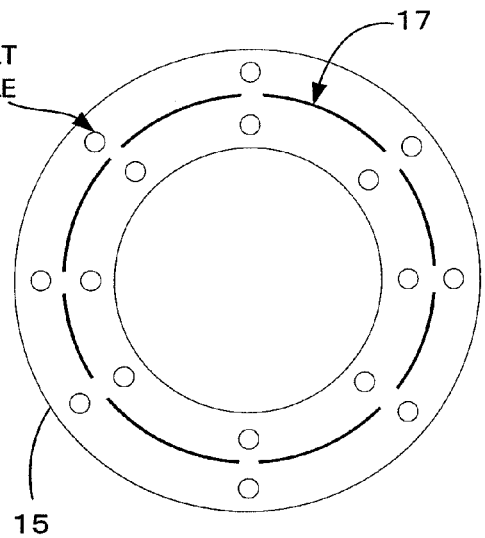
FIG. 3C is a view showing a second example of a region (part of the annular region) at which the mold clamping force transmission plate shown in FIG. 3A is thinned.

A mold clamping device of an injection molding machine using a stationary platen according to a second embodiment of the invention will now be described with reference to FIGS. 3A, 3B and 3C.

That region (region 17 of FIG. 3A) of the mold clamping force transmission plate 15 which is situated between the bolts 22 that connect the mold clamping force transmission plate 15 and the tie-bar connecting member 13 and the bolts 22 that connect the transmission plate 15 and the mold mounting plate 14 is reduced in thickness. The region 17 in which the transmission plate 15 is thinned may be formed covering the entire circumference of an annular region between the bolts 22, as shown in FIG. 3B. Alternatively, the region 17 may be a part of the annular region between the bolts 22, as shown in FIG. 3C. Since the mold clamping force transmission plate 15 is easily deformable at the region 17 that is thinned in this manner, a deformation based on the mold clamping force can be transmitted less easily to the mold mounting plate 14.

Figure 4:
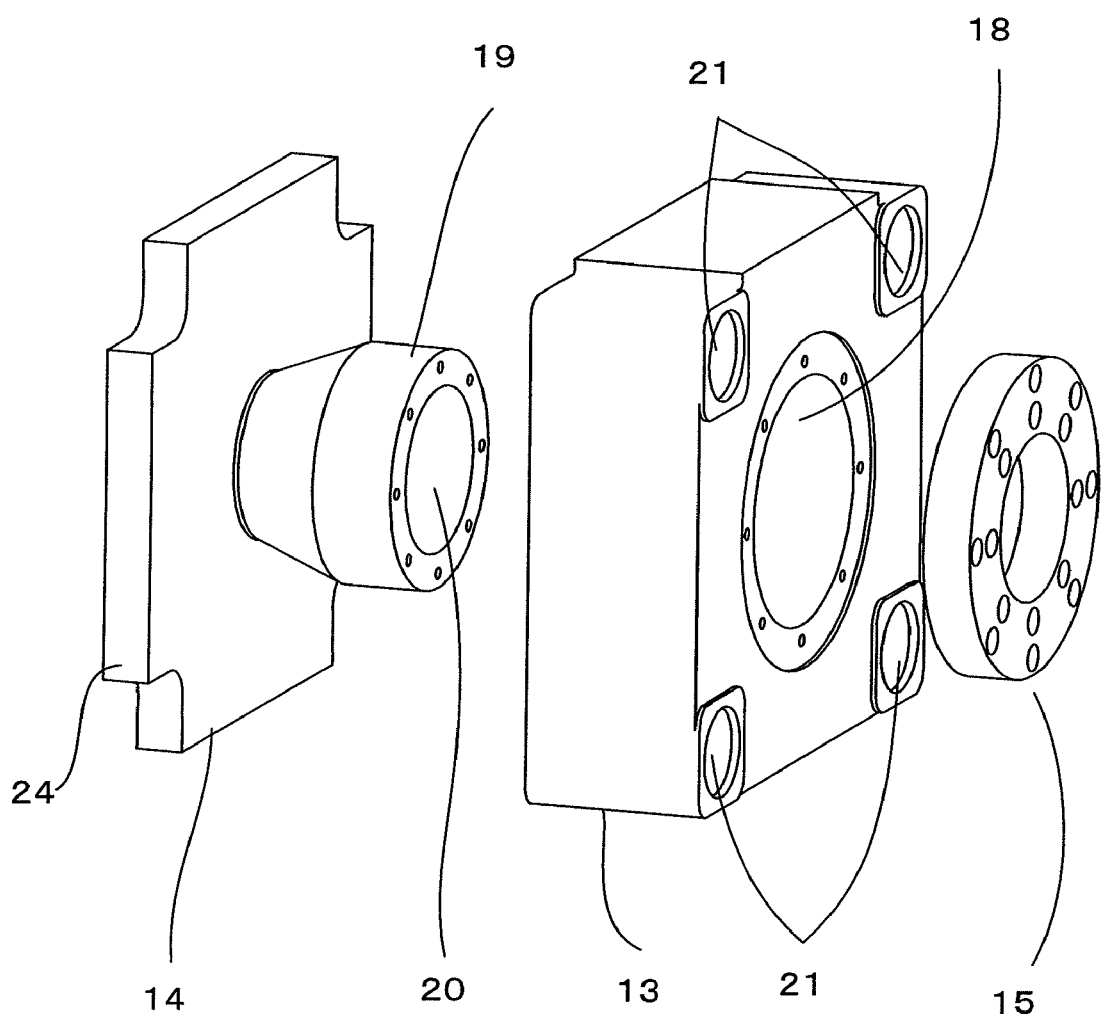
FIG. 4 is an exploded perspective view showing the stationary platen of FIG. 1 composed of a tie-bar connecting member, a mold mounting plate, and the mold clamping force transmission plate.
Figure 5:
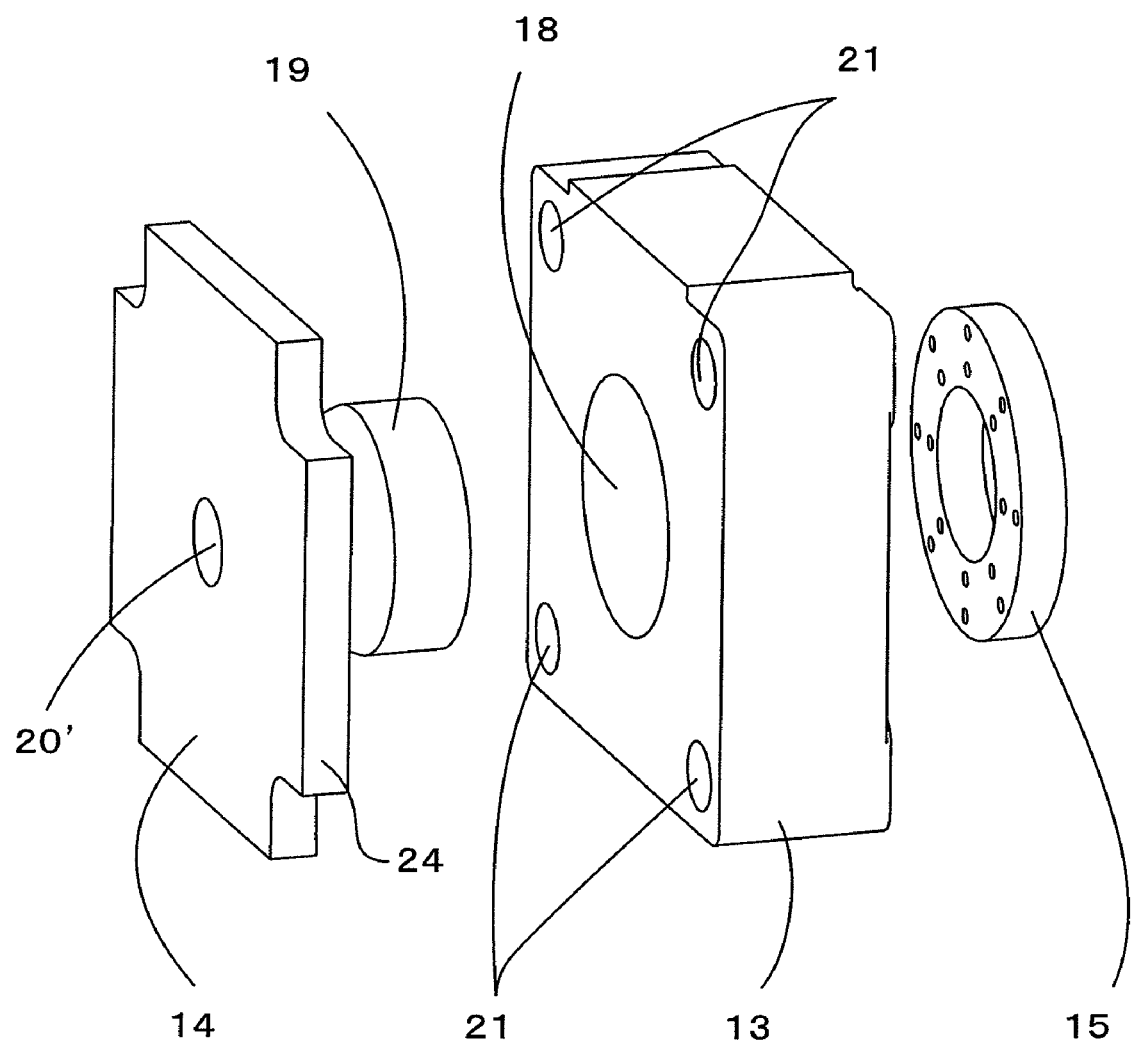
FIG. 5 is an exploded perspective view showing the stationary platen of FIG. 1 composed of the tie-bar connecting member, the mold mounting plate, and the mold clamping force transmission plate.
Figure 6:
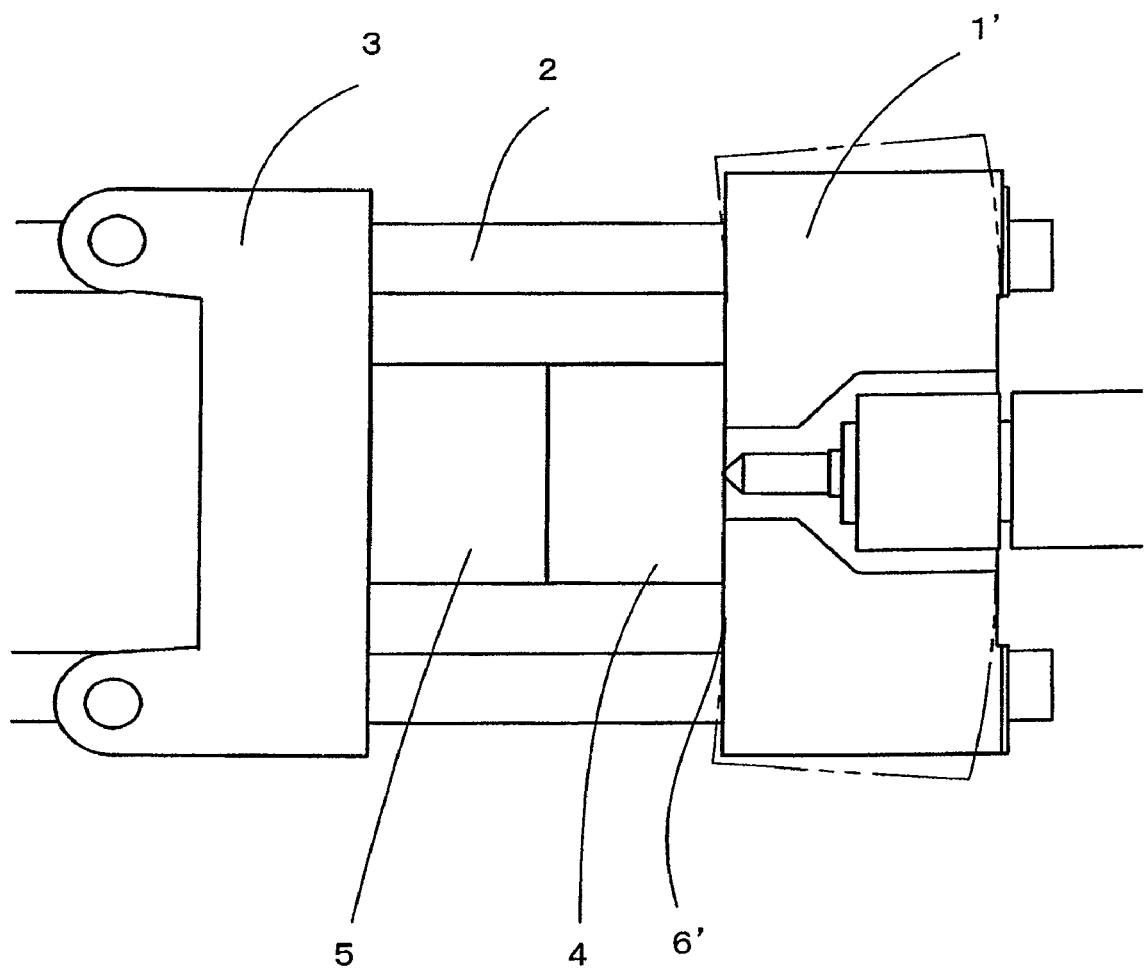
FIG. 6 is a view showing a mold clamping device of an injection molding machine using a prior art stationary platen.
Figure 7:
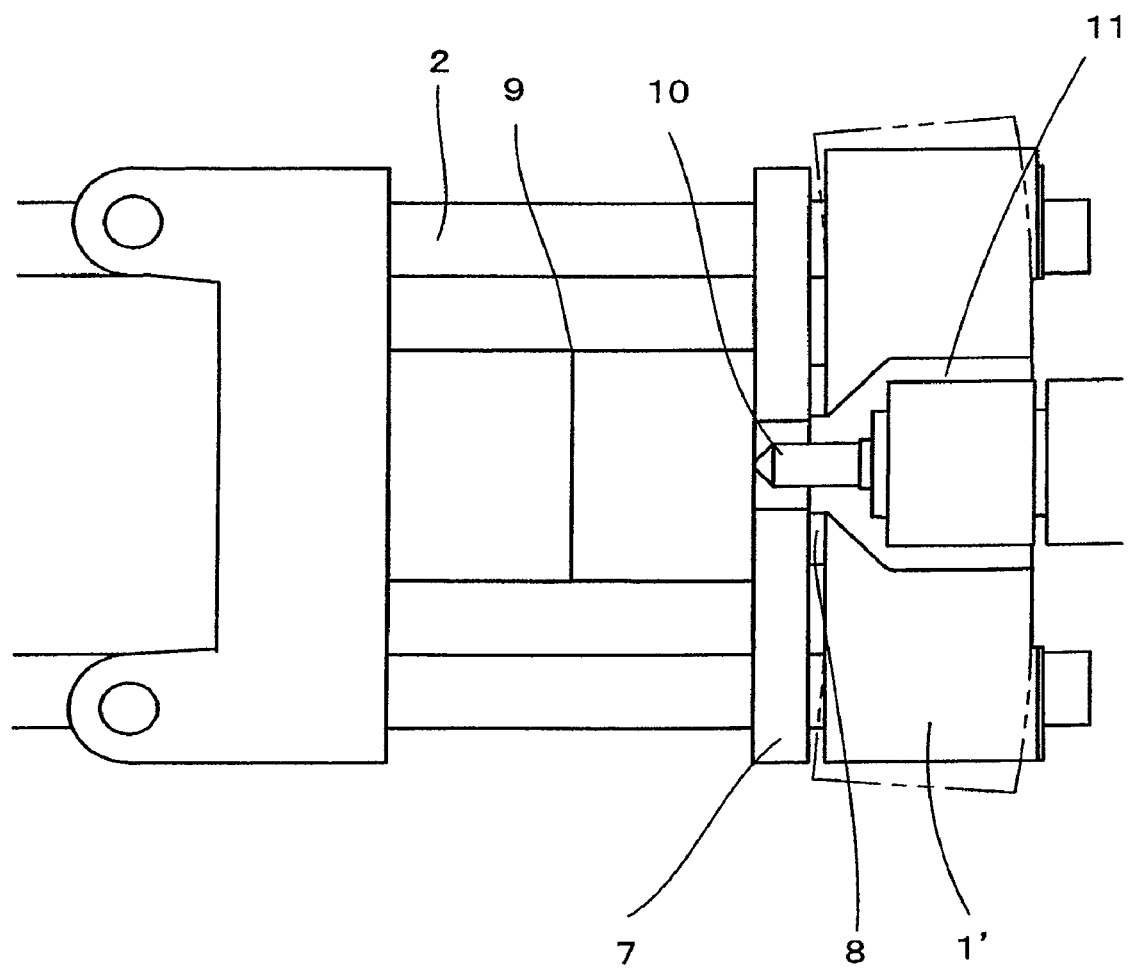
FIG. 7 is a view showing an improved example of the mold clamping device of FIG. 6, in which a stationary platen is provided with a mold clamping force transmission portion with a small outside diameter.
Figure 8:
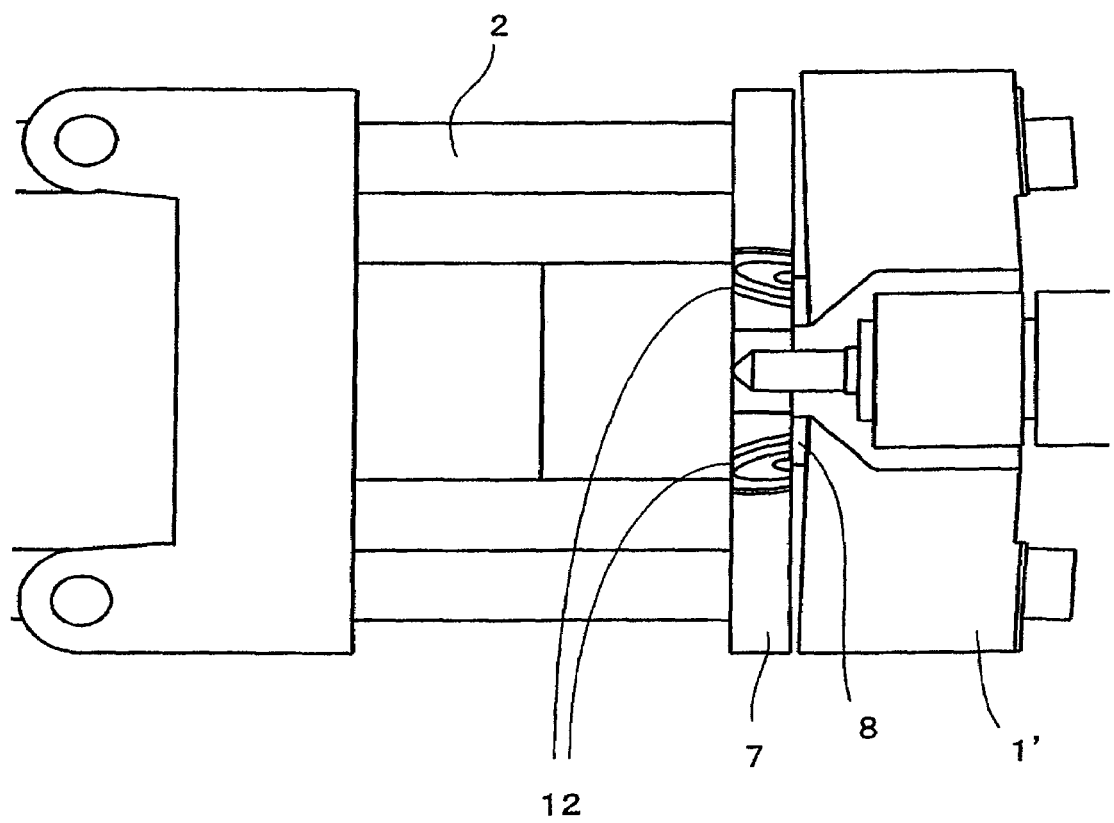
FIG. 8 is a view showing a stress distribution observed when a mold clamping force acts on the mold clamping device of FIG. 7.

The construction of the stationary platen that is composed of the tie-bar connecting member 13, mold mounting plate 14, and mold clamping force transmission plate 15 will now be described in detail with reference to FIGS. 4 and 5.

The tie-bar connecting member 13 is provided with through holes 21 at its four corners into which the tie bars 2 are inserted, in addition to the through hole 18 formed in the center thereof, through which the mold clamping force is transmitted to the tie bars.

The mold mounting plate 14 is obtained by integrally forming the planar portion 24 for mold fixing, which is located parallel to the movable-platen-side end face of the tie-bar connecting member 13, and the cylindrical connecting portion 19, which extends from the injection-mechanism-side end face of the planar portion 24 to the mold clamping force transmission plate 15 through the central through hole 18 of the connecting member 13. The through hole 20' is disposed in the center of the planar portion 24 so that the distal end of the nozzle 10 can project from the mold mounting surface through it. Further, notches are formed at the four corners of the planar portion 24 lest the planar portion 24 spatially interfere with the tie bars 2.

The mold clamping force transmission plate 15 is a member that connects the tie-bar connecting member 13 and the mold mounting plate 14 with the predetermined gap 23 (e.g., about 5 mm long) therebetween, and it is formed with holes for the insertion of the bolts 22.

Corresponding to the holes in the mold clamping force transmission plate 15 for the bolts 22, bolt holes are individually formed in that surface of the tie-bar connecting member 13 which faces the transmission plate 15 and the end face of the cylindrical connecting portion 19 of the mold mounting plate 14.

What is claimed is:

1. A stationary platen of an injection molding machine, comprising:
    a mold mounting plate integrally formed of a planar portion for mold fixing and a cylindrical connecting portion extending from the planar portion;
    a tie-bar connecting member having a first through hole for tie bar insertion and a second through hole penetrated by the cylindrical connecting portion; and
    a mold clamping force transmission plate which connects respective injection-mechanism-side end faces of the cylindrical connecting portion and the tie-bar connecting member.

2. The stationary platen of an injection molding machine according to claim 1, wherein the cylindrical connecting portion of the mold mounting plate is formed so that the outside diameter of a junction with the planar portion for mold fixing is smaller than that of a junction with the mold clamping force transmission plate.

3. The stationary platen of an injection molding machine according to claim 1, wherein at least a part of an annular region of the mold clamping force transmission plate defined between a mounting portion for the tie-bar connecting member and a mounting portion for the cylindrical connecting portion is reduced in thickness as compared with the thickness of a neighboring region other than the annular region of the mold clamping force transmission plate.

4. The stationary platen of an injection molding machine according to claim 1, wherein the mold clamping force transmission plate connects the respective injection-mechanism-side end faces of the cylindrical connecting portion and the tie-bar connecting member with a predetermined gap therebetween lest the tie-bar connecting member and the mold mounting plate come into contact and interfere with each other.

5. The stationary platen of an injection molding machine according to claim 4, wherein a deformation transmission resistant elastic member of the tie-bar connecting member to the mold mounting plate is disposed in a gap between a movable-platen-side end face of the tie-bar connecting member and an injection-mechanism-side end face of the planar portion of the mold mounting plate.

\* \* \* \* \*